United States Patent Office 3,554,008
Patented Jan. 12, 1971

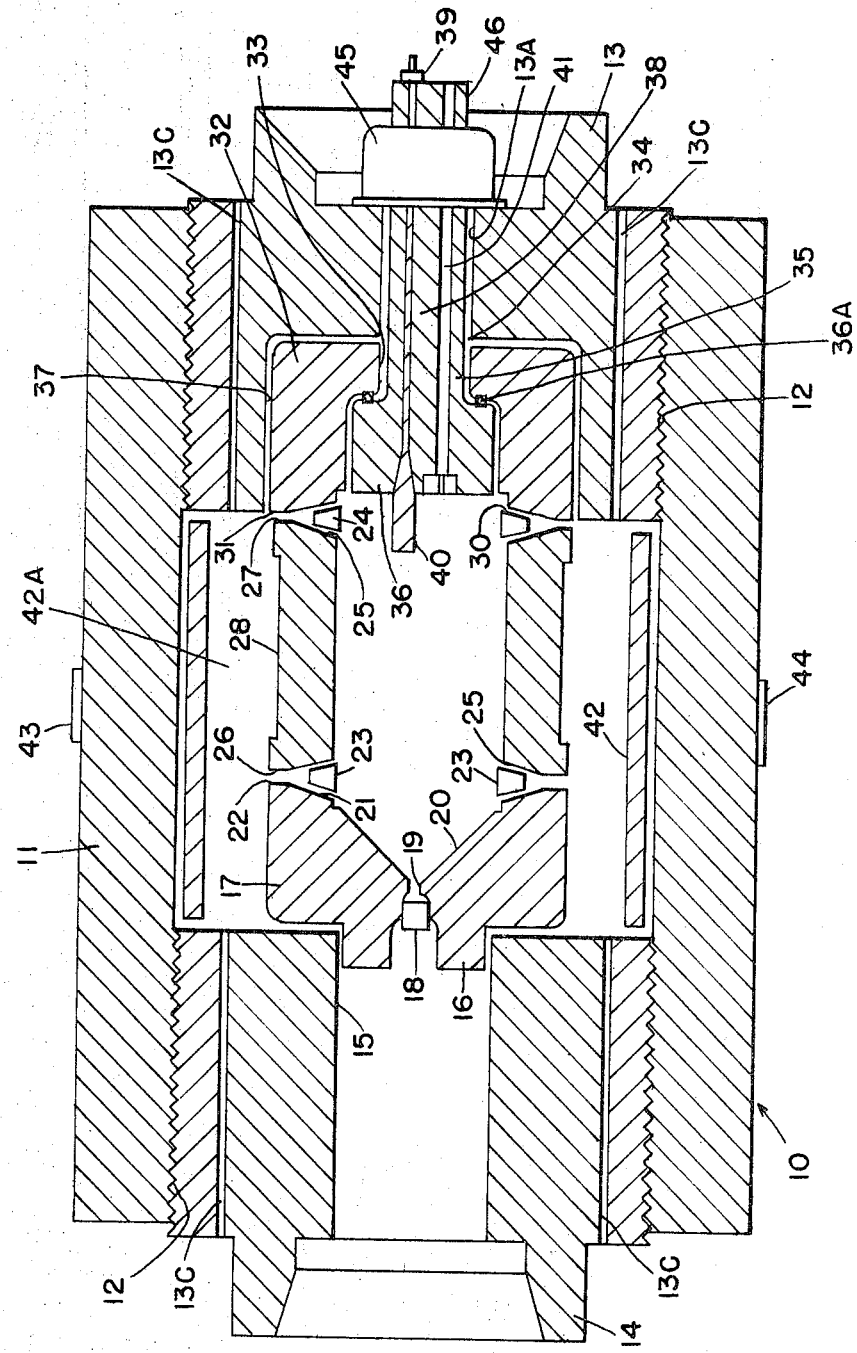

3,554,008
PRESSURE VESSEL APPARATUS
Melvin Zaid, Jericho, N.Y., and Stanley Wachtell, Teaneck, N.J., assignors, by mesne assignments, to the United States of America as represented by the Secretary of the Army
Filed July 1, 1969, Ser. No. 838,118
Int. Cl. G01n 33/22; B65d 25/18
U.S. Cl. 73—35                                    7 Claims

ABSTRACT OF THE DISCLOSURE

An ultra high pressure vessel for propellant testing in which two concentric cylinders enable the testing of burning properties of propellant and explosive materials at pressures up to 400,000 p.s.i., and wherein the inner cylinder has outwardly expendible seal means whereby seal tightening is obtained as the developed pressure increases.

---

The invention described herein may be manufactured, used, and licensed by or for the Government for governmental purposes without the payment to us of any royalty thereon.

This invention relates to pressure vessels and, more particularly, to an ultra high pressure vessel arrangement for propellant and explosive testing.

One of the objects of the invention is to provide a pressure vessel construction that permits development and measurement of propellant pressures to such a great extent, heretofore unattainable by reasonable means.

Another object is to provide such a vessel having a dynamic sealing system.

A further object is to provide such a vessel which is capable of sustaining very high, short duration pressures.

These and other objects, advantages and features will become more apparent from the following description and accompanying drawing which is an elevational sectional view of a pressure vessel arrangement embodying the principles of the invention.

The double-walled ultra high pressure vessel, shown generally at 10, includes an outer cylinder 11 having internally threaded end portions 12, 12 in which matingly threaded end plugs or members 13, 14 are adjustably positioned. End plug 14 has a central aperture or passage 15 in which is seated a reduced protruding annulus 16 of an end member 17 for the inner cylinder arrangement.

The inner cylinder end member 17 is centrally apertured and threaded for securing an appropriate mounting 18 for a suitable pressure gage or transducer (not shown) by which internal pressure measurements can be observed or obtained. End member 17 has a conically shaped surface 20 leading away from central aperture 19 a considerable distance to a point where it substantially intersects the inner edge of the annular beveled or inclined face portion 21 formed on transverse face 22.

An annular bevel shaped expanding seal 23 has a pair of outwardly reduced tapering sidewalls for sealing against the beveled face portion 21 and a mating annular beveled face portion 25 formed on the both ends 26, 27 of inner cylinder sidewall portion 28. A seal 24, similar to and axially spaced from seal 23, likewise sealingly seats on cylinder end 27 and a mating annular beveled surface 30 formed on the transverse face 31 of cup-shaped end member 32 which is centrally apertured at 33 in cooperative alignment with central passage 13A of end plug 13 to slidably receive the reduced shank portion 34 of ignition plug 35.

Ignition plug 35 has its enlarged or head portion 36 seated in the cup or recess of end member 32 that itself seats in the centrally recess wall 37 of end plug 13. A soft metal washer forms a seal between ignition plug 35 and end member 32. This metal flows or is deformed to improve the seal as pressure develops in the chamber. Plug 35 has an elongated firing electrode 38 extending therethrough and secured thereto by nut 39. The enlarged end 40 of the electrode 38 is juxtapositioned the propellant or charge (not shown) within the inner cylinder upon its assembly for developing the test pressure gas therein. A longitudinal small exhaust orifice 41 is provided in the ignition plug 35 to allow for a small pressure bleed during or immediately after the pressure build-up. The vessel is capable of sustaining very high (400,000 p.s.i.), short duration pressures and the build-up pressure leakage is negligable for data utlization purposes.

The sealing system, utilizing the dynamic type of expanding seals 23, 24, becomes more effective as the developed pressure is increased.

A soft iron protection pipe or cylindrical liner 42 is provided for the mid-length inner surface of the outer cylinder 11 which has strain gages 43, 44 cemented thereto. Each end plug 13, 14 has a plurality of longitudinal exhaust ports 13C that communicatively connect the annular chamber 42A surrounding the inner cylinder with the atmosphere.

During assembly, the vessel construction is substantially rigidly arranged via the threaded adjustments of the end plugs 13, 14 in the outer cylinder 11 and the heavy securing nut 45 threadedly carried by the shank end 46 of ignition plug 35.

Thus, the outer cylinder 11 is stressed only lengthwise by the pressure or forces transmitted through end plugs 13, 14 which enables the strain gage media, properly calibrated to consider the effective areas of the significant elements, to ascertain the inner chamber pressure by providing measured readings parallel to the direction of outer wall stress.

We wish it to be understood that we do not desire to be limited to the exact details of construction shown and described, for obvious modifications will occur to a person skilled in the art.

We claim:

1. In an ultra high pressure vessel for propellant testing and having an outer cylinder and centrally apertured end plugs adjustably secured in corresponding end portions of said outer cylinder, an inner cylinder having a pair of end members respectively slidably mounted in said end plugs, a cylindrical sidewall portion intermediate said end members and having a pair of annular inclined end face portion, said end members having an annular inclined face portion adjacent the corresponding sidewall end face portion and therewith defining an axially spaced pair of beveled seats, a pair of annular bevel shaped expanding seals positioned within corresponding ones of said seats, means for securing one of said end members to its corresponding end plug, and gage means on at least one of said outer cylinder and end members for determining propellant developed pressure within said inner cylinder.

2. The structure of claim 1 wherein said one end member includes an ignition plug extending through a centrally apertured cup-shaped portion thereof and its apertured end plug, and said securing means includes a nut threadedly carried by said ignition plug.

3. The structure in accordance with claim 2 in which a firing electrode extends through said ignition plug to within said inner cylinder.

4. The structure in accordance with claim 1 wherein an exhaust orifice extends through said ignition plug.

5. The structure of claim 4 in which a cylindrical pipe lines the inner surface of said outer cylinder, and exhaust means extending through said end plugs communicatively connect the chamber intermediate said inner and outer cylinders with the atmosphere.

6. The structure of claim 1 in which the other of said end members has a central aperture, and said gage means is mounted therein.

7. The structure in accordance with claim 1 in which said gage means includes a strain gage secured to an outer sidewall surface of said outer cylinder.

References Cited
UNITED STATES PATENTS 3,159,997    12/1964    Talton, Jr. et al. _____ 73—35
3,267,721    8/1966     Jacobs et al. _____ 73—35

JAMES J. GILL, Primary Examiner

U.S. Cl. X.R.

220—3, 9